United States Patent [19]
Arai et al.

[11] Patent Number: 5,606,390
[45] Date of Patent: Feb. 25, 1997

[54] VISUAL-LINE DETECTING DEVICE AND OPTICAL APPARATUS HAVING THE SAME

[75] Inventors: Takashi Arai, Tokyo; Osamu Morita; Kitahiro Kaneda, both of Kanagawa-ken; Tatsuya Yamazaki, Tokyo, all of Japan

[73] Assignee: Canon Kabushiki Kaisha, Tokyo, Japan

[21] Appl. No.: 239,921

[22] Filed: May 9, 1994

Related U.S. Application Data

[63] Continuation of Ser. No. 949,730, Sep. 23, 1992.

[30] Foreign Application Priority Data

Sep. 27, 1991 [JP] Japan .................................. 3-249212
Sep. 27, 1991 [JP] Japan .................................. 3-249213
Jan. 7, 1992 [JP] Japan .................................. 4-000507

[51] Int. Cl.$^6$ .................................................. G03B 7/00
[52] U.S. Cl. .......................................................... 396/51
[58] Field of Search ................................ 354/410, 400, 354/195.1, 219, 62; 250/206

[56] References Cited

U.S. PATENT DOCUMENTS

| | | | |
|---|---|---|---|
| 3,724,932 | 4/1973 | Cornsweet et al. | 250/206 |
| 3,936,849 | 2/1975 | Tsujimoto | 354/195 |
| 4,574,314 | 3/1986 | Weinblatt | 354/400 |
| 4,828,381 | 5/1989 | Shindo | 354/62 |
| 4,836,670 | 6/1989 | Hutchinson | 354/62 |
| 4,974,010 | 11/1990 | Cleveland et al. | 354/62 |
| 5,036,347 | 1/1991 | Tsunekawa et al. | 354/62 |
| 5,155,516 | 10/1992 | Shindo | 354/219 |
| 5,182,443 | 1/1993 | Suda et al. | 354/62 |
| 5,214,466 | 5/1993 | Nagano et al. | 354/62 |
| 5,225,862 | 7/1993 | Nagano et al. | 354/62 |

Primary Examiner—Russell E. Adams
Attorney, Agent, or Firm—Robin, Blecker, Daley & Driscoll

[57] ABSTRACT

A camera capable of utilizing a visual line of a photographer for a photographic operation is provided. The camera includes a visual-line detecting part for detecting a visual line (fixation point) of the photographer and a correcting part for correcting a deviation between the fixation point detected by the visual-line detecting part and an actual fixation point of the photographer's eye. The correcting part operates in association with a starting operation of the camera.

26 Claims, 16 Drawing Sheets

VISUAL-LINE DETECTING DEVICE AND OPTICAL APPARATUS HAVING THE SAME

This is a continuation of prior application Ser. No. 07/949,730, filed Sep. 23, 1992.

BACKGROUND OF THE INVENTION

1. Field of the Invention

The present invention relates to a device for detecting a visual line (line of sight) and to an optical apparatus capable of operating under control utilizing the detected visual line.

2. Description of the Related Art

In the following description, reference will be made to a camera which is one example of such an optical apparatus.

In recent years, with the rapid advance of electronic circuits or photoelectric conversion devices such as CCDs, the operations of cameras have increasingly been automated and various intelligent camera systems have been proposed.

It is said that this kind of automation has realized great improvements in that the operability of cameras has been greatly improved and in that even an ordinary person has become able to take a satisfactory photograph without the need of high photographic techniques.

However, the incorporation of automatic functions tends to impose limitations on the freedom of photography because of hardware limitations involved in the automatic functions. Accordingly, it is desired to provide a radical solution to this problem.

The most serious problem is that such an automatic camera is generally arranged in such a manner that its automatic control, whether automatic focus adjustment or automatic exposure control, can only function on a center-weighted basis with the result that a photographer is forced to select a photographic composition in which a main subject is located in the middle of a viewfinder screen.

Particularly in the case of focusing, it is necessary to accurately aim the camera at the main subject since it is photographically meaningless to focus all subjects on the viewfinder screen on the average. Accordingly, to succeed in photography, it is necessary to select a photographic composition in which the main subject is located in a position where an automatic focus detecting device can operate.

To solve the above-described problems, the concept of selecting a focus-determining area (distance-measuring point) on the basis of the visual line of a photographer is disclosed in Japanese Laid-Open Patent Application No. Sho 61-61135.

It has also been proposed to provide an apparatus which detects the position in an observing plane which an observer is observing, that is, an apparatus which detects a so-called visual line (visual axis).

For example, in Japanese Laid-Open Patent Application No. Sho 61-172552, it is stated that a parallel beam of light from a light source is projected onto the anterior segment of an eyeball of an observer and a visual axis is obtained by utilizing the position of a cornea-reflected image due to light reflected from the cornea and the image-forming position of the pupil. The visual-line detecting method will be described below with reference to FIGS. 19 and 20.

FIGS. 19 and 20 are views which serve to illustrate the principle of the visual-line detecting method. FIG. 19 is a schematic view of a visual-line detecting optical system, and FIG. 20 is an intensity diagram of an output signal from the photoelectric element array 6 shown in FIG. 19.

Referring to FIG. 19, a light source 5 is made from a light emitting diode for radiating infrared light to which an observer is insensitive, and is disposed in a focal plane of a light projecting lens 3.

Infrared light emitted from the light source 5 is collimated by the light projecting lens 3, and the obtained parallel beam of light is reflected by a half-mirror 2 and illuminates a cornea 21 of an eyeball 201.

At this time, a cornea-reflected image "d", which is formed by a portion of the infrared light reflected by the surface of the cornea 21, is transmitted through the half-mirror 2 and converged by a light receiving lens 4, whereby the cornea-reflected image "d" is formed at a position Zd' on the photoelectric element array 6.

Respective light rays from ends "a" and "b" of an iris 23 pass through the half-mirror 2 and the light receiving lens 4 and are focused at positions Za' and Zb' on the photoelectric element array 6 to form corresponding images of the ends "a" and "b".

If a rotating angle θ of an optical axis ii of the eyeball 201 with respect to the optical axis (optical axis i) of the light-receiving lens 4 is small, a Z coordinate Zc of a center "c" of the iris 23 is expressed as:

$$Zc=(za+Zb)/2$$

where Za and Zb represent the Z coordinates of the respective ends "a" and "b" of the iris 23.

If Zd represents the Z coordinate of a position where the cornea-reflected image "d" is formed and Oc represents the distance between a center of curvature, "O", of the cornea 21 and the center "c" of the iris 23, the rotating angle θ of the optical axis ii of the eyeball 201 substantially satisfies the following relation:

$$Oc \times \sin\theta = Zc - Zd \tag{1}$$

where the Z coordinate Zd of the position where the cornea-reflected image "d" is formed coincides with the Z coordinate of the center of curvature, "O", of the cornea 21. Accordingly, if the positions of individual singular points (the cornea-reflected image "d" and the images of the ends "a" and "b" of the iris 23), which are projected onto the photoelectric element array 6 as shown in FIG. 20, are detected, it is possible to find the rotating angle θ of the optical axis ii of the eyeball 201 by means of computing means 9.

In this case, the expression (1) can be rewritten as follows:

$$\beta \times Oc \times \sin\theta = (Za' + Zb')/2 - Zd' \tag{2}$$

where β is an image-forming magnification and is normally an approximately constant value. The image-forming magnification β is determined by a distance L1 between the position where the cornea-reflected image "d" is formed and the light receiving lens 4 and a distance L0 between the light receiving lens 4 and the photoelectric element array 6.

As is known, if the surfaces of optical systems such as the cornea of the eyeball and the crystalline lens are respectively regarded as spherical surfaces, the optical axis of the eyeball can be determined by connecting the centers of the respective spherical surfaces. However, when a person is actually observing an object, the person's eye is fixed on a point on an extended line of a line which connects the central fovea of the retina and the anterior nodal point. As a result, a certain extent of deviation occurs between the optical axis of the eyeball and the visual axis thereof, depending on a personal error peculiar to the observer.

As a proposal for solving this problem, Japanese Laid-Open Patent Application No. Hei 1-274736 discloses the art of correcting the angle deviation between the optical axis and the visual axis of the eyeball of the observer and detecting the visual line thereof.

If the horizontal rotating angle θ of the optical axis of the eyeball of the observer is calculated and angle correction δ is applied to the angle deviation between the eyeball optical axis and the visual axis, the horizontal rotating angle θH of the visual line of the observer is expressed as:

θH=θ+δ where the sign ± is determined in such a way that if the sign + represents the angle of rightward rotation with respect to the observer, the sign + is selected when the observer's left eye is used to look into an observing device and, when the observer's right eye is used to look into it, the sign − is selected.

The vertical rotating angle of the visual line of the observer coincides with a vertical rotating angle θ' of the optical axis of the eyeball.

However, in the case of the above-described angle correction relative to a personal error associated with visual-line detection, a photographer must take the trouble to set a correcting mode for executing personal error correction. In addition, each time photographers change, it is necessary to set the correcting mode to again perform personal error correction.

When a plurality of photographers are operating a single camera by turns during photography, if a particular photographer forgets to perform a personal error correcting operation, operation control utilizing the visual line will cause an erroneous operation of the camera.

SUMMARY OF THE INVENTION

It is, therefore, an object of the present invention to provide a novel camera which satisfies the usefulness, preciseness and high-speed response of an automatic function as well as the freedom of photography under manual control.

To achieve the above object, according to one aspect of the present invention, there is provided a camera capable of utilizing a visual line of a photographer for a photographic operation. The camera includes visual-line detecting means for detecting a visual-line position of the photographer and correcting means for correcting a deviation between the visual-line position detected by the visual-line detecting means and an actual visual-line position of the photographer's eye. The correcting means operates in association with a starting operation of the camera.

Other objects and advantages of the invention will become apparent from the following detailed description taken in conjunction with the accompanying drawings.

DETAILED DESCRIPTION OF THE PREFERRED EMBODIMENTS

Preferred embodiments of the present invention will be described below with reference to the accompanying drawings. By way of example, the following description is made in connection with a video camera to which the present invention is applied.

Figure 1:
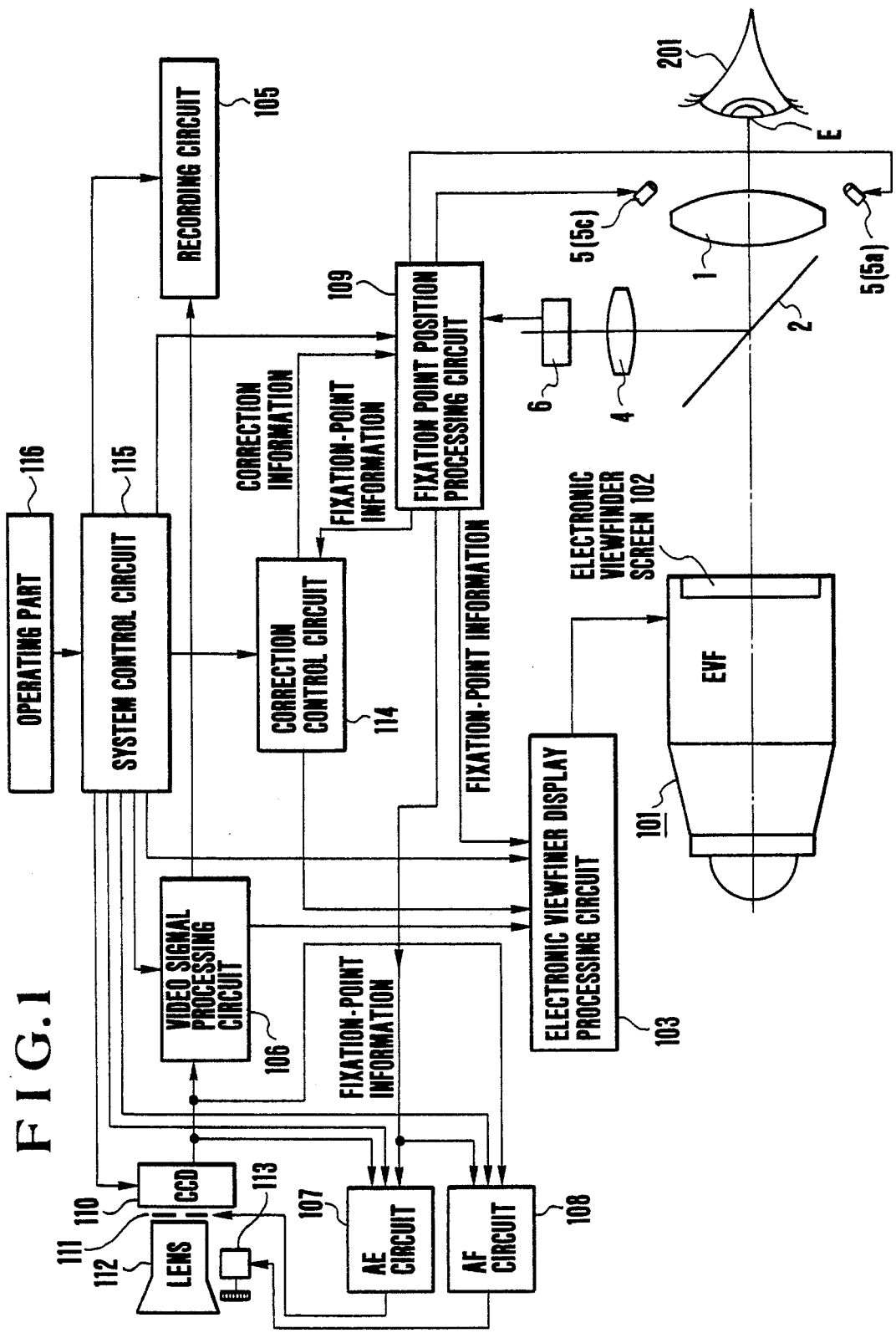
FIG. 1 is a schematic block diagram showing the essential parts of a video camera according to a first embodiment of the present invention.

FIG. 1 is a schematic block diagram showing the essential parts of a video camera according to a first embodiment of the present invention.

The video camera shown in FIG. 1 includes an eyepiece lens 1 and a dichroic mirror 2 of the type which transmits visible light and reflects infrared light. The dichroic mirror 2 is obliquely disposed inwardly of the eyepiece lens 1 and serves as an optical-path splitter.

Figure 2:
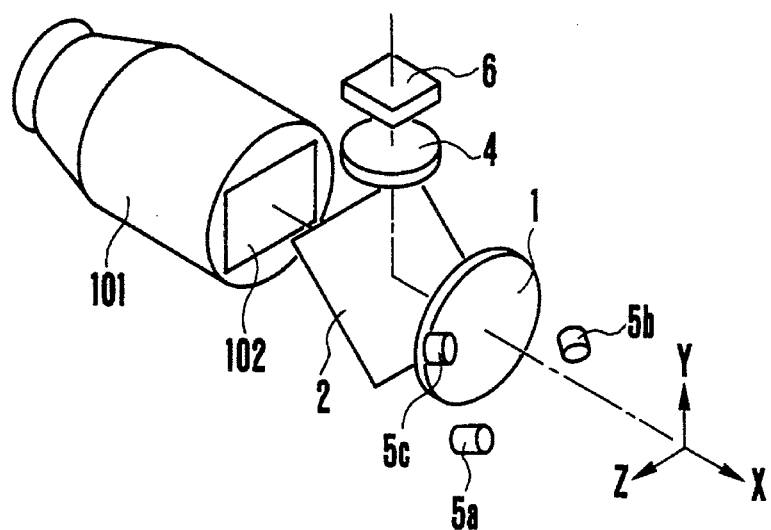
FIG. 2 is a perspective view showing the visual line detecting system shown in FIG. 1.

The video camera also includes a light receiving lens 4 and illuminating means 5. The illuminating means 5 is made up of three infrared light emitting diodes 5a, 5b and 5c which are disposed at different positions which will be described later. (The infrared light emitting diode 5b is shown in FIG. 2.)

The video camera also includes a photoelectric element array 6, and the light receiving lens 4 and the photoelectric element array 6 which constitute part of light receiving means. The photoelectric element array 6 usually employs a device in which a plurality of photoelectric elements are one-dimensionally arranged in the direction perpendicular to the sheet surface of FIG. 1. However, a device in which photoelectric elements are two-dimensionally arranged may be used as required.

The aforesaid constituent elements 1, 2, 4, 5 and 6 constitute a system for detecting the visual line of an eyeball 201 of a photographer (observer).

The video camera also includes an electronic viewfinder (EVF) 101 having an electronic viewfinder screen 102.

In the first embodiment, a video image displayed on the electronic viewfinder screen 102 is conducted to an eye point E through the eyepiece lens 1.

Visual line detecting means according to the first embodiment is made up of the aforesaid visual line detecting system composed of the constituent elements 1, 2, 4, 5 and 6 as well as circuits included in a fixation point position processing circuit 109 which serves as computing means, such as an eyeball optical axis detecting circuit, an eyeball identifying circuit, a visual axis correcting circuit and a fixation point detecting circuit.

In the visual line detecting system, infrared light rays emitted from the illuminating means (infrared light emitting diodes (IRED)) 5 illuminate the eyeball 201 of the observer located in the vicinity of the eyepoint E.

Infrared light rays reflected from the eyeball 201 are reflected by the dichroic mirror 2, converged by the light receiving lens 4, and focused on the photoelectric element array 6 to form corresponding images.

The fixation point position processing circuit 109 operates in accordance with the software of a microcomputer and is operated under control of the system control circuit 115.

The video camera also includes an electronic viewfinder display processing circuit 103 for mixing a fixation point display signal with a video signal or for switching a visual display on the electronic viewfinder screen 101 to a correcting screen display in accordance with an input signal from a correction control circuit 114 which will be described later. The electronic viewfinder display processing circuit 103 also performs display processing associated with other visual displays such as a warning display.

The video camera also includes a recording circuit 105 for forming a recording signal to be recorded on a recording medium, and a video signal processing circuit 106 for converting an image signal formed by an image sensor (CCD) 110 into a predetermined video signal.

The video camera also includes an automatic iris (AE) circuit 107 for providing exposure control, an autofocus (AF) circuit 108 for providing AF control, a focusing motor 113, an image sensing CCD 110, an lens iris 111, and a lens group 112.

The video camera also includes the correction control circuit 114 for detecting a deviation between the direction of the actual visual line of the observer and the direction of the visual line detected by the above-described visual line detecting means and outputting personal error correction information. The correction control circuit 114 is controlled by the system Control circuit 115.

The system control circuit 115 controls the operation of each element of the apparatus, and an operating part 116 has switches such as a power switch and a photographic-mode setting switch.

The sequence of processing of an ordinary video image obtained by photography using the video camera which is arranged in the above-described manner will be described below.

An image obtained by the lens group 112 is received by the CCD 110 through the lens iris 111.

A signal which is read from the CCD 110 in accordance with a control signal outputted from the system control circuit 115 is sent to the recording circuit 105 through the video signal processing circuit 106.

The signal outputted from the CCD 110 is also inputted to both of the AE circuit 107 and the AF circuit 108. The AF circuit 108 detects the edge of the image outputted from the CCD 110 to control the AF motor 113. The AE circuit 107 detects the luminance of the same image to control the lens iris 111.

In the meantime, an output signal of the video signal processing circuit 106 is mixed with a signal representative of a cursor indicative of a fixation point position in the electronic viewfinder display processing circuit 103. Then, the image thus obtained is displayed on the electronic viewfinder screen 102 of the EVF 101.

Information provided by the fixation point position processing circuit 109 is sent to the electronic viewfinder processing circuit 103, as well as to the AE circuit 107 and the AF circuit 108. The information is used for setting an area which includes the fixation point as well as a portion adjacent thereto, and a video signal is extracted from such an area to execute AE/AF with respect to the fixation point or the adjacent portion.

A method of detecting the position of a visual line (fixation point) of an observer (photographer) in the video camera according to the first embodiment of the present invention will be described below in detail with reference to FIGS. 1 to 5.

Figure 3A:
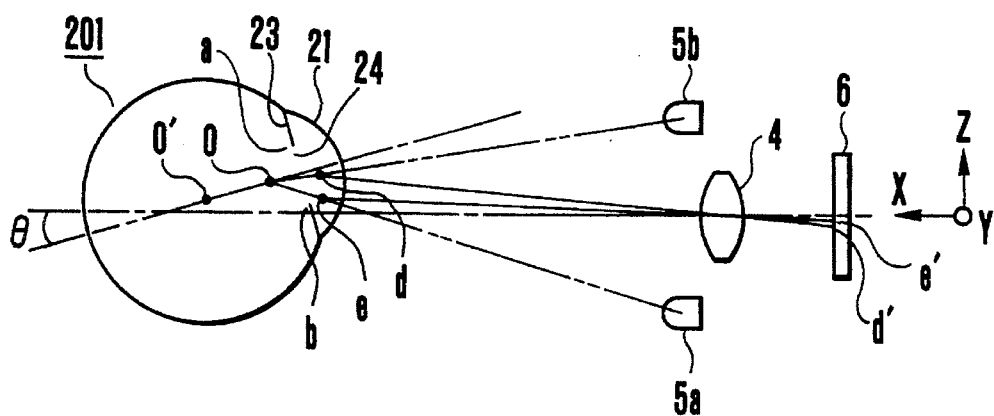
FIGS. 3(A) and 3(B) are diagrams showing the optical principle of the visual line detecting system of FIG. 2.
Figure 3B:
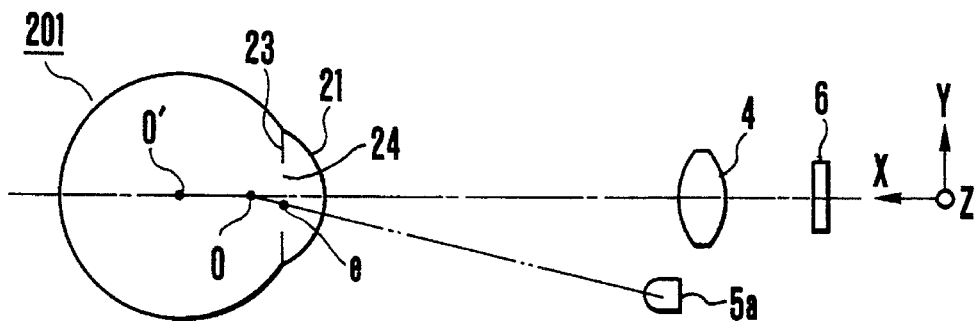

FIG. 2 is a perspective view showing the essential parts of the visual line detecting system shown in FIG. 1, and FIGS. 3(A) and 3(B) are diagrams showing the optical principle of the visual line detecting system.

Of the infrared light emitting diodes 5a, 5b and 5c provided for illumination purpose, two diodes are selectively used according to the attitude of the video camera to detect the distance between the video camera and the eyeball 201 of the observer. Specifically, the infrared light emitting diodes 5a and 5b are selected when the video camera is placed in a horizontal position, while the infrared light emitting diodes 5a and 5c are selected when the video camera is placed in a vertical position.

Although camera attitude detecting means is not specifically shown in FIG. 2, 3(A) or 3(B), attitude detecting means is useful which utilizes a mercury switch or the like.

The infrared light emitting diodes 5a and 5b are disposed at positions which are shifted from the optical axis (X axis) of the light receiving lens 4 in an arrayal direction (z-axis direction) of the photoelectric element array 6 and in a direction (Y-axis direction) perpendicular to the arrayal direction.

Referring to FIG. 3(A), light beams are emitted from the respective infrared light emitting diodes 5a and 5b, which are spaced apart from each other in the arrayal direction (Z-axis direction) of the photoelectric element array 6. The respective light beams form cornea-reflected images (virtual images) "e" and "d" at positions which are spaced apart in the Z-axis direction.

The Z coordinate of the middle point between the cornea-reflected images "e" and "d" coincides with the Z coordinate of a center of curvature, "O", of a cornea 21.

The distance between the cornea-reflected images "e" and "d" varies in correspondence with the distance between the infrared light emitting diodes 5a, 5b and the eyeball 201 of the observer. Accordingly, an image-forming magnification β of a cornea-reflected image reflected from the eyeball 201 and formed on the photoelectric element array 6 can be found by detecting positions Ze' and Zd' of cornea-reflected images e' and d' formed on the photoelectric element array 6. The image-forming magnification β is a magnification determined by the distance between the eyeball 201 and the light receiving lens 4.

Referring to FIG. 3(B), the infrared light emitting diode 5a and the infrared light emitting diode 5b (not shown), which are respectively disposed in the directions perpendicular to the arrayal direction of the photoelectric element array 6, illuminate the eyeball 201 of the observer obliquely from below. Accordingly, if the eyeball 201 of the observer is not rotating in the vertical direction (i.e., in an X-Y plane), the cornea-reflected image "e" ("d" is not shown) is formed at a position which is shifted from the center of curvature, "O", of the cornea 21 and the center of a pupil 24 in the -Y direction as viewed in FIG. 3(B).

Figure 4A:
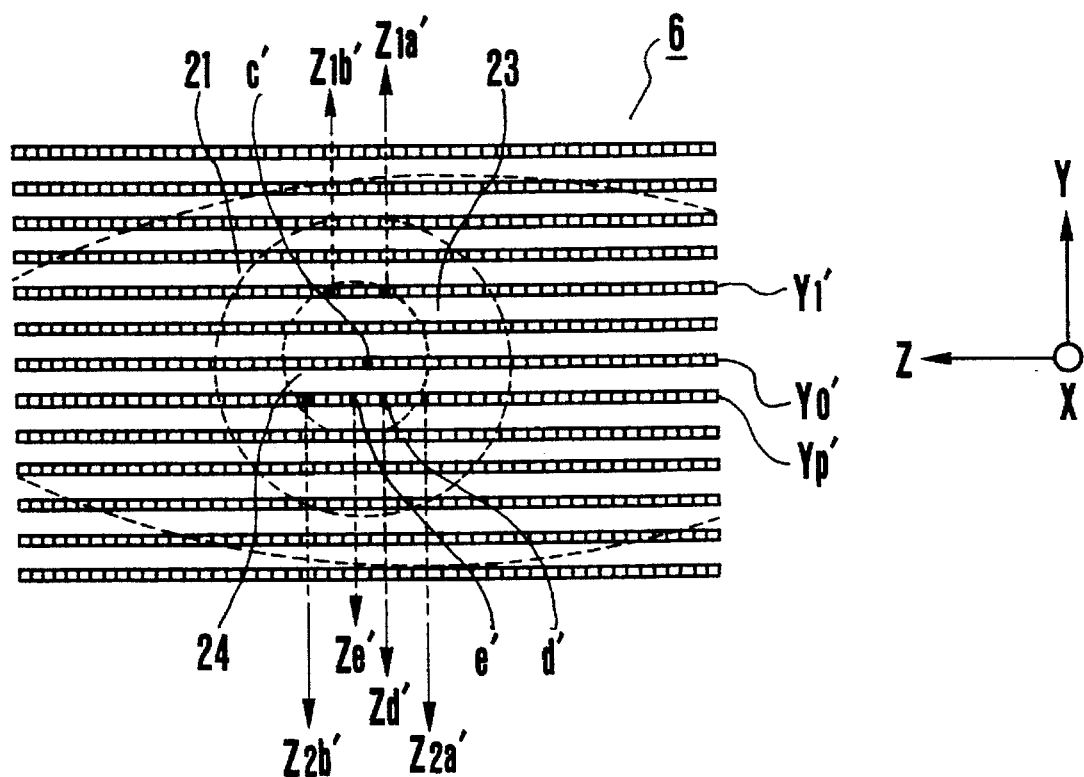
FIGS. 4(A) and 4(B) are diagrams showing reflected images which are projected onto a photoelectric element array according to the first embodiment.
Figure 4B:
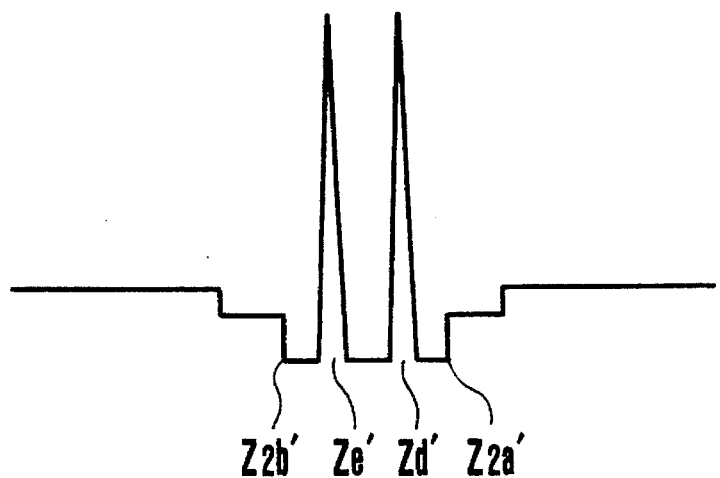

FIG. 4(A) is an explanatory view showing an image which is reflected from the eyeball 201 and projected onto the photoelectric surface of the photoelectric element array 6 on which a plurality of photoelectric element array lines are arranged. In FIG. 4(A), there is shown the image reflected from the eyeball 201 and projected onto the photoelectric element array 6 according to the first embodiment. As shown in FIG. 4(A), the cornea-reflected images e' and d' are formed on a photoelectric element array line Yp'. FIG. 4(B) shows an output signal obtained from the photoelectric element array line Yp'.

Figure 5:
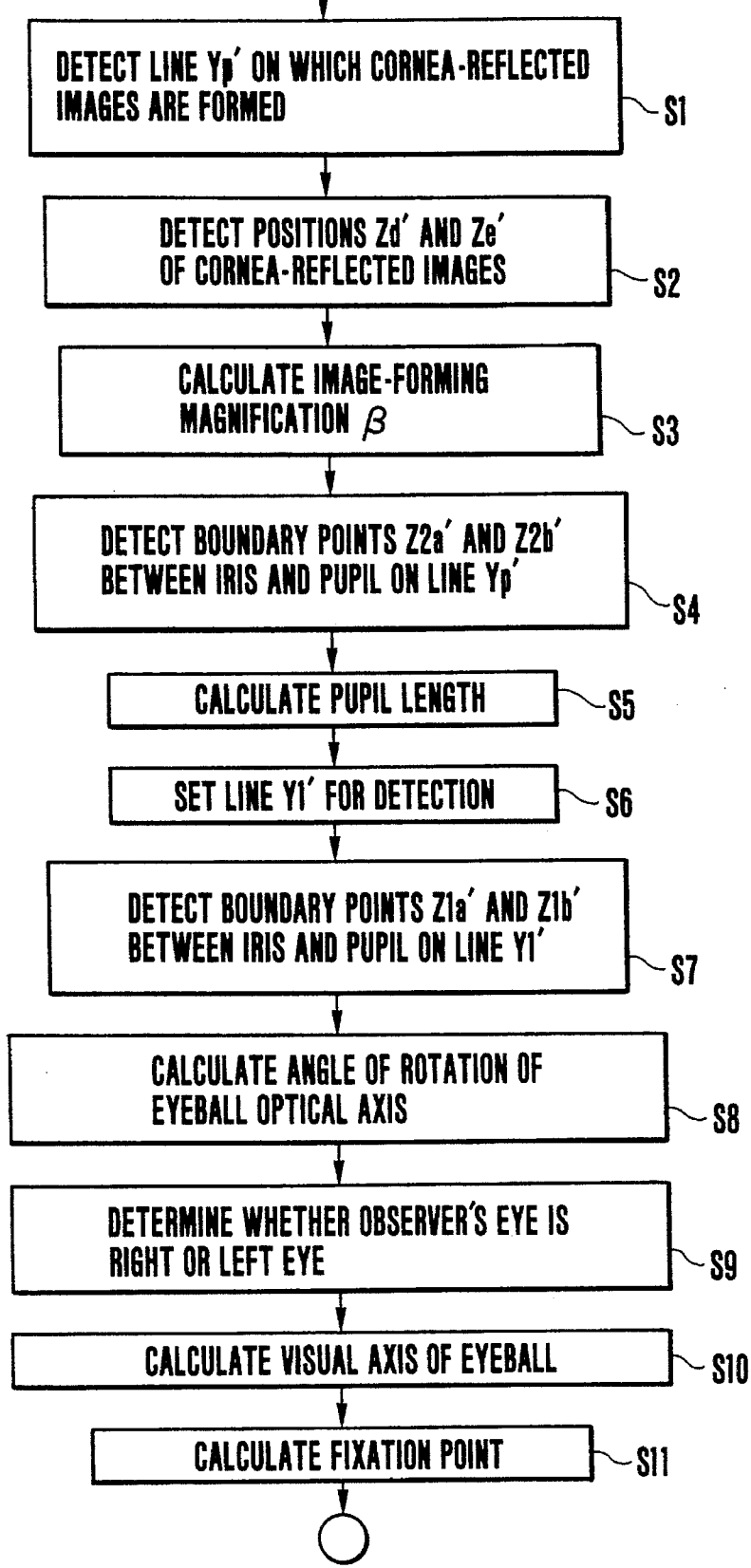
FIG. 5 is a sequence flowchart of a visual-line detecting method according to the first embodiment.

A visual line detecting operation according to the first embodiment will be described below with reference to the sequence flowchart of FIG. 5.

In Step S1, image signals are read from the photoelectric element array 6 in a sequential order from the -Y direction as shown in FIG. 4(A), whereby the photoelectric element array line Yp' on which the cornea-reflected images e' and d' are formed is detected.

In Step S2, the positions Zd' and Ze' in the arrayal direction where the cornea-reflected images e' and d' are respectively formed, are detected.

In Step S3, the image-forming magnification β of the optical system is found from a distance |Zd'−Ze'| between the cornea-reflected images e' and d'.

In Step S4, boundary points Z2a' and Z2b' between an iris 23 and the pupil 24 on the photoelectric element array line Yp' are detected. In Step S5, a pupil length |Z2d'−Z2b'| on the photoelectric element array line Yp' is calculated.

The process proceeds to Step S6. As shown in FIG. 4(A), the photoelectric element array line Yp' on which the cornea-reflected images e' and d' are formed is usually located in the -Y direction in FIG. 4(A) with respect to a photoelectric element array line Y0' on which a center c' of the pupil 24 is present. Another photoelectric element array line Y1' from which image signals are to be read is found by calculations using the image-forming magnification β and the pupil length. The photoelectric element array line Y1' is set to be spaced a sufficient distance apart from the photoelectric element array line Yp'.

Similarly, in Step S7, boundary points Z1a' and Z1b' between the iris 23 and the pupil 24 on the photoelectric element array line Yp' are detected, and the position (Zc', Yc') of the center c' of the pupil 24 is found by using at least three points from among the boundary points (Z1a', Y1'), (Z1b', Y1') and the boundary points (Z2a', Yp'), (Z2b', Yp').

In Step S8, the rotating angle of the eyeball optical axis is calculated. More specifically, if the above-described expression (2) is modified by using the positions (Zd', Yp') and (Ze', Yp') of the respective cornea-reflected images d' and e', rotating angles θz and θy of the eyeball optical axis satisfy:

$$\beta \times Oc \times \sin\theta z = Zc' - (Zd' + Ze')/2 \qquad (3)$$

$$\beta \times Oc \times \sin\theta y = Yc' - Yp' + \delta Y' \qquad (4)$$

where δY' is a correction value which corresponds to the amount in which the positions on the photoelectric element array 6 where the cornea-reflected images e' and d' are respectively formed are shifted in the Y-axis direction with respect to the Y coordinate of the center of curvature, "O", of the cornea 21 because the illuminating means (infrared light emitting diodes) 5 are shifted from the optical axis of the light receiving lens 4 in a direction perpendicular to the arrayal direction of the photoelectric element array 6.

In Step S9, in the eyeball identifying circuit included in the fixation point position processing circuit 109, it is determined whether the observer's eye which is presently used to look into the electronic viewfinder 101 is the right eye or the left eye, on the basis of, for example, the distribution of the rotating angle of the eyeball optical axis.

In Step S10, in the visual axis correcting circuit included in the fixation point position processing circuit 109, correction of the visual axis is executed on the basis of the eyeball identification information obtained in Step S9 and the rotating angle of the eyeball optical axis obtained in Step S8.

In Step S11, in the fixation point detecting circuit, a fixation point is calculated on the basis of the optical constant of an optical system disposed on the electronic-viewfinder side.

A personal error correcting operation associated with visual-line detection will be described below with reference to FIGS. 6 and 7.

Figure 6:
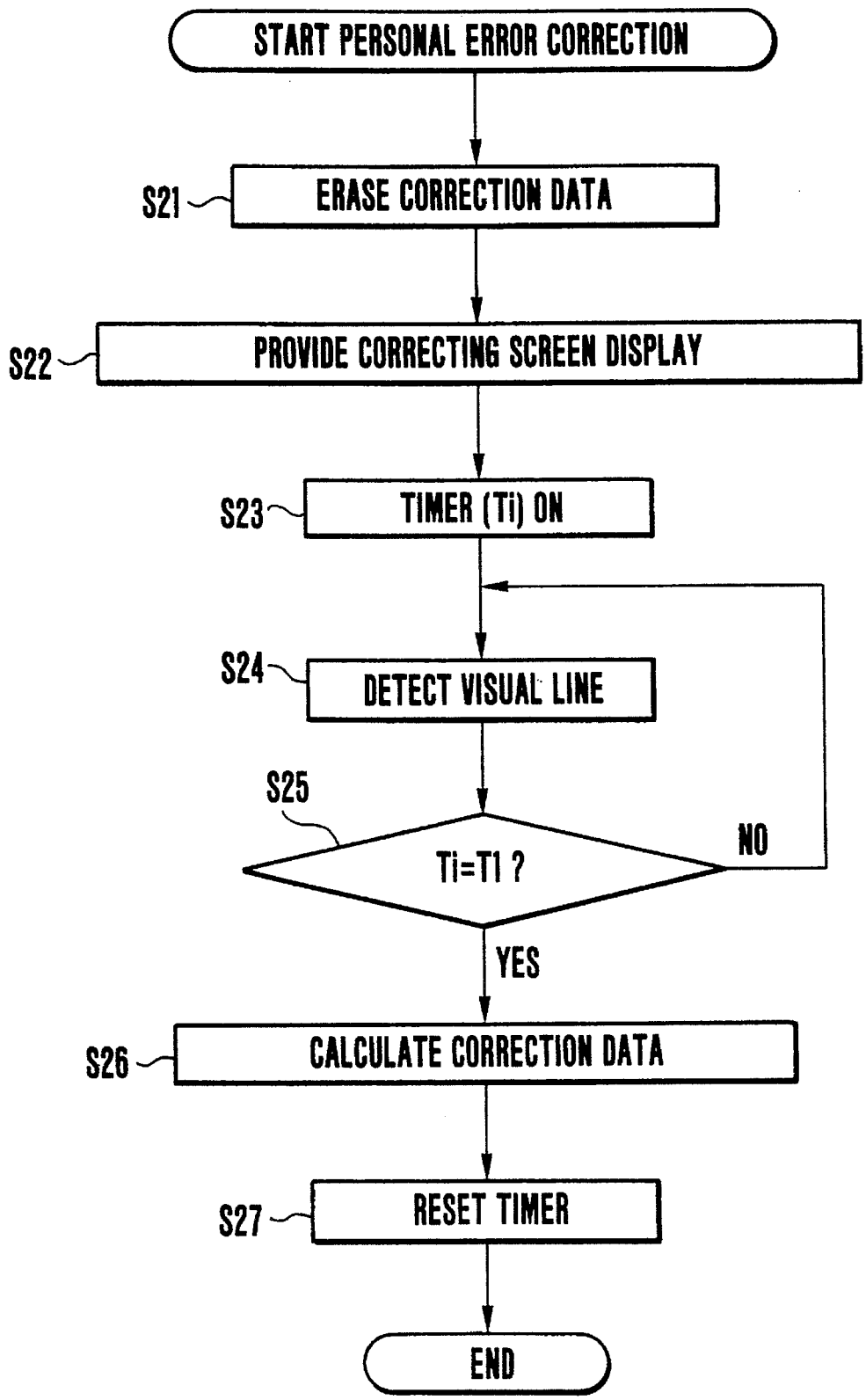
FIG. 6 is a flowchart showing a personal error correcting operation associated with visual-line detection in the first embodiment.
Figure 7:
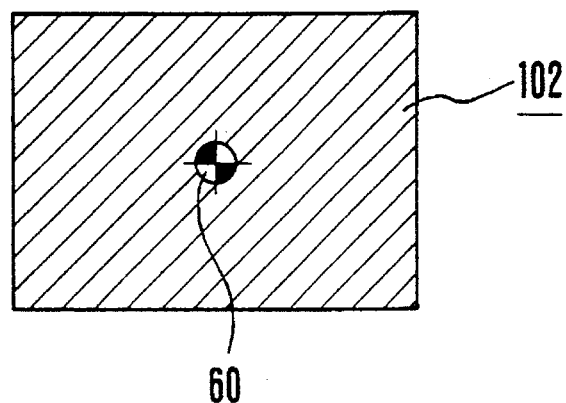
FIG. 7 is a view showing one display example which is provided on an electronic viewfinder screen during personal error correction associated with visual-line detection according to the first embodiment.

FIG. 6 is a flowchart of the personal error correcting operation, and FIG. 7 shows a first display example which is provided on the electronic viewfinder screen 102 during the personal error correcting operation.

Referring to FIG. 6, when the flow of the personal error correcting operation starts, first of all, correction data which has been inputted into the fixation point position processing circuit 109 is erased in Step S21.

In Step S22, a video signal for a correcting screen is outputted from the correction control circuit 114, and a visual display on the electronic viewfinder screen 102 is switched to a correcting screen display. More specifically, a fixation-point target (fixation target) 60 such as that shown in FIG. 7 is displayed on the electronic viewfinder screen 102 with a one-color background.

In Step S23, a timer (Ti) provided in the correction control circuit 114 is turned on.

In Step S24, the above-described visual line detecting means detects a fixation point on which the photographer's eye is fixed, thereby providing a plurality of pieces of information on the fixation point.

In Step S25, it is determined whether the timer has reached a predetermined time (Ti=T1). If it is determined that the predetermined time has not yet been reached, the process returns to Step S24. If it is determined that the predetermined time has been reached, the process proceeds to Step S26.

In Step S26, correction data is calculated on the basis of the plurality of pieces of information on the fixation point detected in Step S24. More specifically, the visual line detecting means detects the fixation point of the photographer's eye which is fixed on the fixation target, and information on the position of the fixation point is inputted into the correction control circuit 114. The correction control circuit 114 finds a deviation between the position of the detected fixation point and the position of the fixation target to obtain the amount of correction ($\delta$) of the visual axis (correction information).

The obtained correction information is inputted into the fixation point position processing circuit 109. The fixation point position processing circuit 109 performs correction associated with fixation-point detection on the basis of the inputted correction information. The correction information is memorized in the fixation point position processing circuit 109.

The process proceeds to Step S27 where the timer is reset, and the personal error correcting operation is ended.

In Step S23, to turn on the timer, the photographer may operate a timer switch provided on the body of the video camera. If the timer switch is provided, it is possible to detect the fixation point as soon as the photographer is ready.

A second example of the personal error correcting operation will be described below.

Figures 8A, 8B:
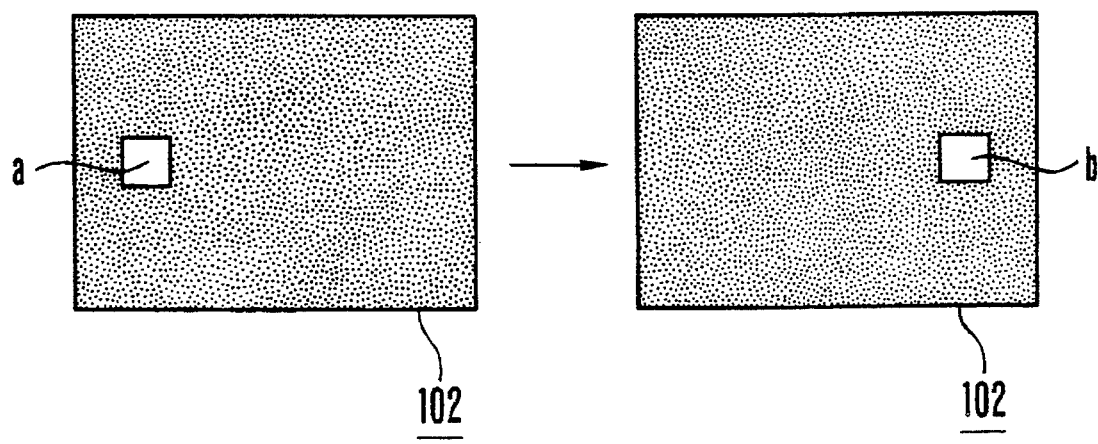
FIGS. 8(A) and 8(B) are views showing another display example which is provided on the electronic viewfinder screen during the personal error correction associated with the visual-line detection according to the first embodiment.

FIGS. 8(A) and 8(B) show a second example of the correcting screen display.

In the second display example, fixation targets on which the photographer's eye is to be fixed are displayed at two positions so that the accuracy of personal error correction is improved over the first display example described above.

Each of the fixation targets is displayed on the electronic viewfinder screen 102 in such a manner that a white fixation target of square shape is displayed against an all-black background.

The second example of the personal error correcting operation will be concretely described below. First of all, a fixation target "a" is lit in white as shown in FIG. 8(A) and the photographer is made to fix his/her eye on the fixation target "a", so that detection of the corresponding fixation point is executed. Then, a fixation target "b" is lit in white as shown in FIG. 8(B) and the photographer is made to fix the eye on the fixation target "b", so that detection of the corresponding fixation point is executed.

The amount of correction ($\delta$) of the visual axis and a corrected value of a distance Oc between the center "c" of the iris and the center of curvature, "O", of the cornea are found from information on the two fixation points detected on the respective screens shown in FIGS. 8(A) and 8(B), thereby executing personal error correction.

A third example of the personal error correcting operation will be described below.

FIGS. 9(A) to 9(F) show a third display example of the correcting screen display.

The manner in which fixation points are displayed on the electronic viewfinder screen 102 is similar to that of the second display example.

Figures 9A, 9B, 9C:
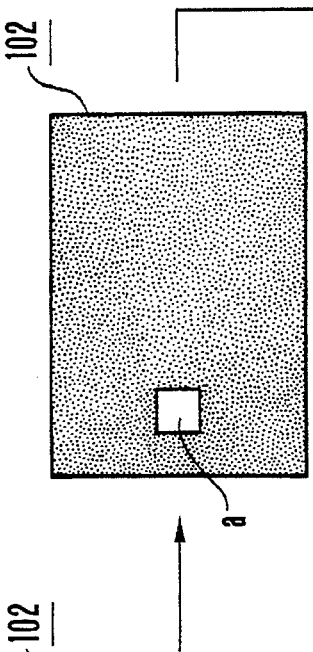
FIGS. 9(A) to 9(F) are views showing another display example which is provided on the electronic viewfinder screen during the personal error correction associated with the visual-line detection according to the first embodiment.

The third example of the personal error correcting operation will be concretely described below. First of all, when a correction start switch included in the operating part 116 is operated, the message "CORRECTING SCREEN STARTED" is displayed on the electronic viewfinder screen 102 as shown in FIG. 9(A). This message informs the photographer of the start of the personal error correcting operation associated with visual-line detection.

Then, as shown in FIG. 9(B), the fixation target "a" is lit in white and, at the same time, the message "LOOK HERE" is displayed, thereby instructing the photographer to fix the eye on the fixation target "a".

Then, the process proceeds to the screen shown in FIG. 9(C). The message displayed on the screen shown in FIG. 9(B) disappears and only the fixation target "a" is lit in white, so that detection of the corresponding fixation point is executed.

Figures 9D, 9E, 9F:
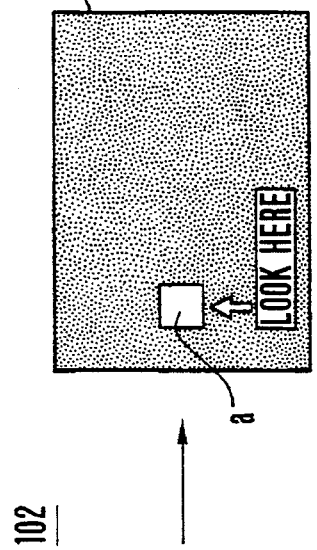

Then, the process proceeds to the screen shown in FIG. 9(D). The fixation target "b" is lit in white and, at the same time, the message "LOOK HERE" is displayed, thereby instructing the photographer to fix the eye on the fixation target "b".

On the screen shown in FIG. 9(E), the message displayed on the screen shown in FIG. 9(D) disappears and only the fixation target "b" is lit in white. Thus, detection of the corresponding fixation point is executed.

After the above-described detecting operations, the amount of correction ($\delta$) of the visual axis and a corrected value of the distance Oc between the center c of the iris and the center of curvature, "O", of the cornea are found from information on the fixation point detected when the photographer's eye was fixed on the fixation target "a" on the screen of FIG. 9(C) and from information on the fixation point detected when the photographer's eye was fixed on the fixation target "b" on the screen of FIG. 9(E), thereby executing personal error correction. The amount of correction ($\delta$) of the visual axis and the corrected value of the distance Oc as found are memorized in the fixation point position processing circuit 109, as in the case of the first display example.

When the personal error correction is completed, the process proceeds to the screen shown in FIG. 9(F) and the message "CORRECTION COMPLETED" is displayed on the electronic viewfinder screen 102 to inform the photographer that a series of personal error correcting operations has been completed.

As described above, in the third display example, the messages are displayed on the electronic viewfinder screen 102 to instruct the photographer to fix the eye on the respective fixation targets, thereby improving the accuracy of personal error correction.

A fourth example of the personal error correcting operation will be described below.

FIGS. 10(A) to 10(F) show a fourth display example of the correcting screen display.

In the fourth example, the photographer is instructed to fix the eye on target points displayed at six positions.

Figures 10A, 10B, 10C:
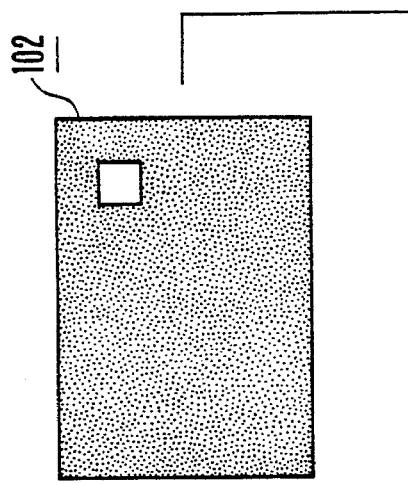
FIGS. 10(A) to 10(F) are views showing another display example which is provided on the electronic viewfinder screen during the personal error correction associated with the visual-line detection according to the first embodiment.
Figures 10D, 10E, 10F:
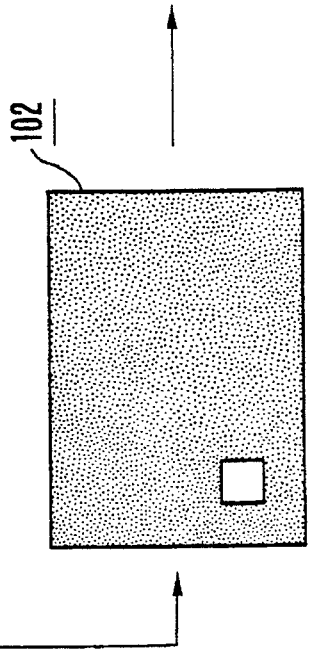

More specifically, correction results detected on the respective screens shown in FIGS. 10(A), 10(B) and 10(C) and those detected on the respective screens shown in FIGS. 10(D), 10(E) and 10(F) are combined to perform horizontal correction of the visual axis. The correction results detected on the respective screens shown in FIGS. 10(A) and 10(D), those detected on the respective screens shown in FIGS. 10(B) and 10(E) and those detected on FIGS. 10(C) and 10(F) are combined to perform vertical correction of the visual axis. In addition, the aforesaid respective corrections are averaged, or averaged by a method of least squares, thereby realizing a further improvement in the accuracy of personal error correction.

The obtained personal error correction results are memorized in the fixation point position processing circuit 109, as in the case of the first display example.

Although not described above, the color of the fixation targets and that of the background on the electronic viewfinder screen may, of course, be arbitrarily combined. For example, black fixation targets may be displayed against a white background.

In general, human beings cannot continue to fix their eyes on only one point for a long time. Accordingly, to further improve the accuracy of personal error correction, a fixation target may not be merely lit but blinking and personal error correction processing associated with visual-line detection may be performed by preferentially using information obtainable in a blinking cycle in which the probability that the photographer concentrates the visual line on the fixation target is the highest.

To further improve the accuracy of personal error correction, the number of fixation targets to be displayed may be increased.

A first example of the system of the video camera encompassed within the scope of the present invention will be described below with reference to FIGS. 11 and 12.

Figure 11:
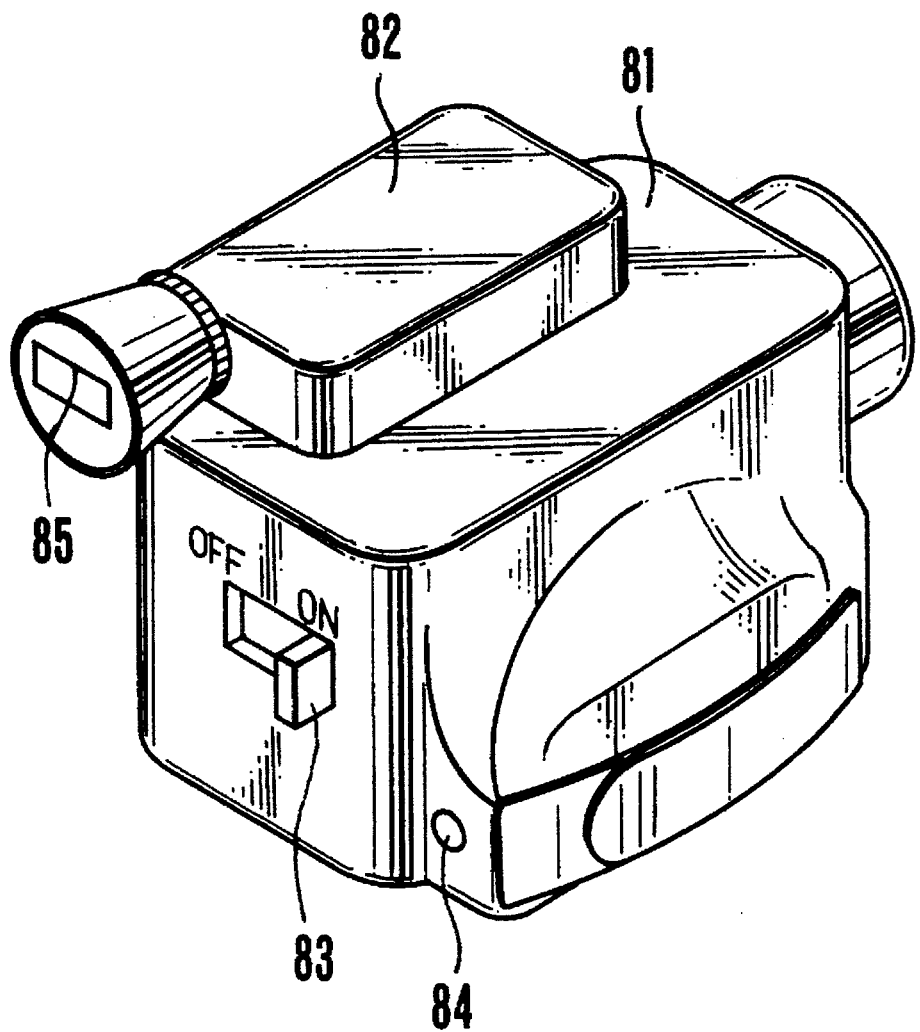
FIG. 11 is a schematic view showing one example of the external appearance of the video camera of FIG. 1.
Figure 12:
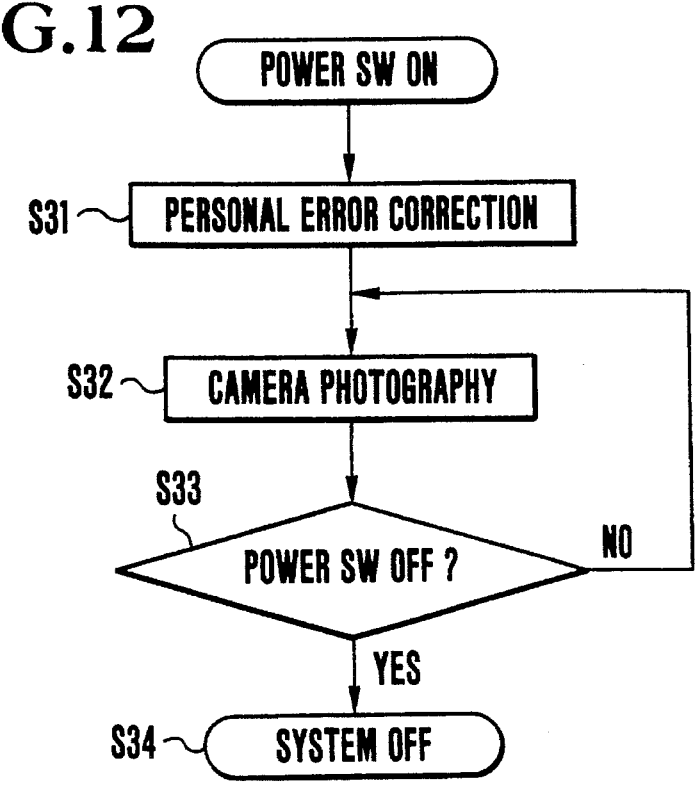
FIG. 12 is a flowchart showing one example of the flow of the operation of the system of the video camera shown in FIG. 11.

FIG. 11 is a schematic view of the external appearance of the first example of the video camera, and FIG. 12 is a flowchart showing the operation of the entire system of the first example.

The video camera shown in FIG. 11 includes a camera body 81, an electronic viewfinder unit 82 for displaying an image which is being photographed and the like, a main power switch 83 for the video camera, an image-recording start/stop switch 84, and an electronic viewfinder screen 85.

The flow of the operation of the entire system will be described below with reference to FIG. 12.

When the main power switch 83 for the video camera is turned on, the system of the video camera is started up to start the flow.

In Step S31, the above-described personal error correction is performed. After Step S31 has been performed, the process proceeds to Step S32. In Step S32, if the image-recording start/stop switch 84 is operated, camera photography is enabled.

In Step S32, when the photography of one scene is completed (when the image-recording start/stop switch 84 which is on is again turned off), the process proceeds to Step S33.

In Step S33, it is determined whether the main power switch 83 has been turned off. If it is determined that it has not yet been turned off, the process returns to Step S32, where the video camera is left in the camera photography-enable state. If it is determined that it has been turned off, the process proceeds to Step S34, where the system is stopped.

In the above-described system operation, when the main power source of the video camera is turned on, the system automatically comes into a personal error correction mode and, then, camera photography is enabled.

A second example of the system of the video camera encompassed within the scope of the present invention will be described below with reference to FIGS. 13 and 14.

Figure 14:
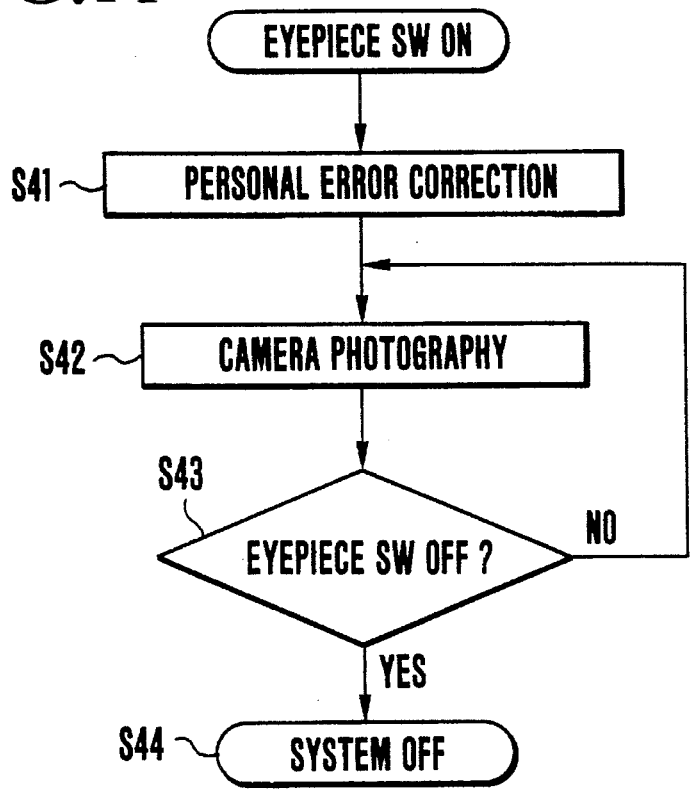
FIG. 14 is a flowchart showing one example of the flow of the operation of the system of the video camera shown in FIG. 13.
Figure 13:
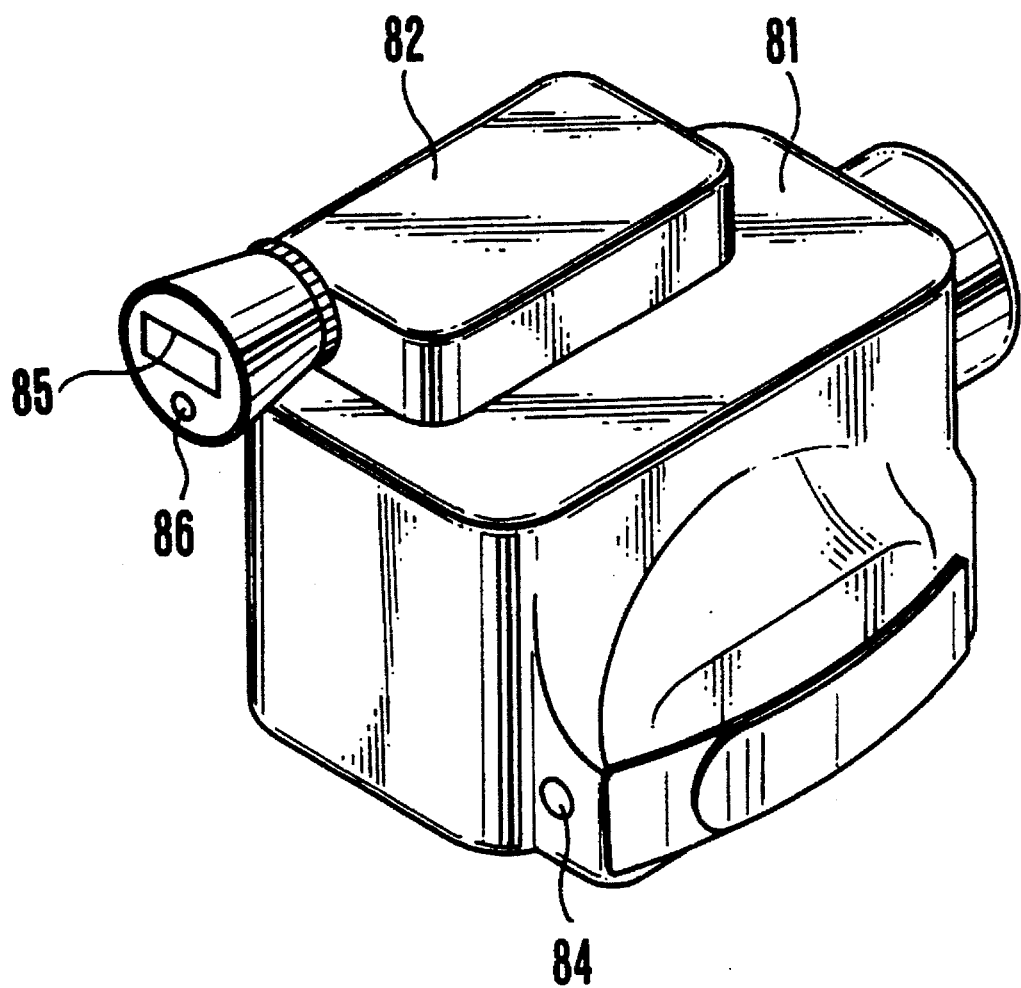
FIG. 13 is a schematic view showing another example of the external appearance of the video camera of FIG. 1.

FIG. 13 is a schematic view of the external appearance of the second example of the video camera, and FIG. 14 is a flowchart showing the operation of the entire system of the second example.

In FIG. 13, the same reference numerals are used to denote elements substantially identical to those shown in FIG. 11, and description thereof is omitted.

As shown in FIG. 13, an eyepiece switch 86 utilizing a touch sensor or the like is embedded in an eyepiece part (near the electronic viewfinder screen 85) of the electronic viewfinder unit 82. When a photographer looks into the electronic viewfinder, the main power source of the video camera is turned on, and when the photographer moves the eye away from the electronic viewfinder, the main power source is turned off.

The flow of the operation of the entire system will be described below with reference to FIG. 14.

When the eyepiece switch 86 of the video camera is turned on (the photographer brings the eye nearer to the electronic viewfinder), the system of the video camera is started up to start the flow.

In Step S41, the above-described personal error correction is performed. After Step S41 has been performed, the process proceeds to Step S42. In Step S42, if the image-recording start/stop switch 84 is operated, camera photography is enabled.

In Step S43, it is determined whether the eyepiece switch 86 has been turned off, that is, it is determined whether the photographer has moved the eye away from the electronic viewfinder.

If it is determined that the photographer has not moved the eye away from the electronic viewfinder, the process returns to Step S42, where the video camera is maintained in the camera photography-enable state. If it is determined that the photographer has moved the eye away from the electronic viewfinder, the process proceeds to Step S44, where the system is turned off.

In the above-described system operation, when the photographer brings the eye nearer to the electronic viewfinder, the main power source of the video camera is automatically turned on and the video camera is automatically set to the personal error correction mode.

A third example of the system of the video camera encompassed within the scope of the present invention will be described below with reference to FIGS. 15 and 16.

Figure 15:
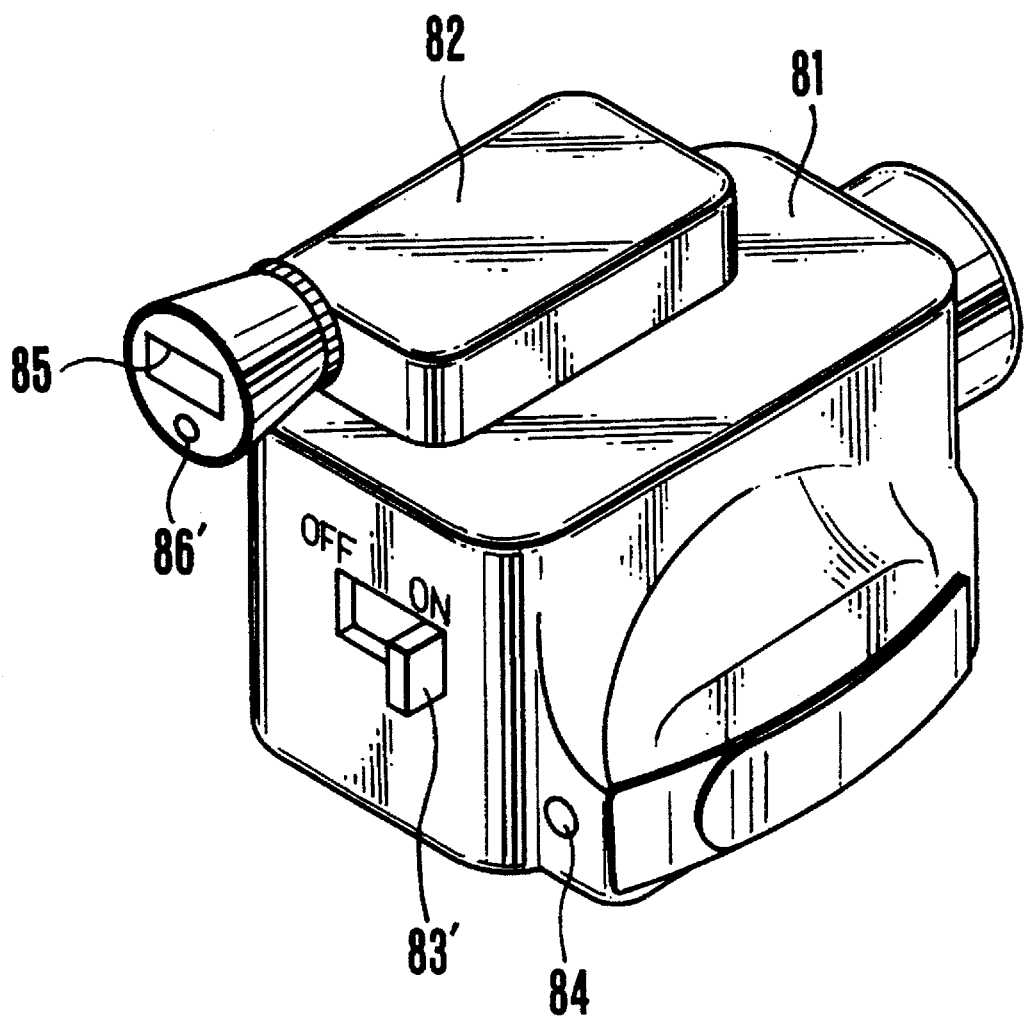
FIG. 15 is a schematic view showing another example of the external appearance of the video camera of FIG. 1.
Figure 16:
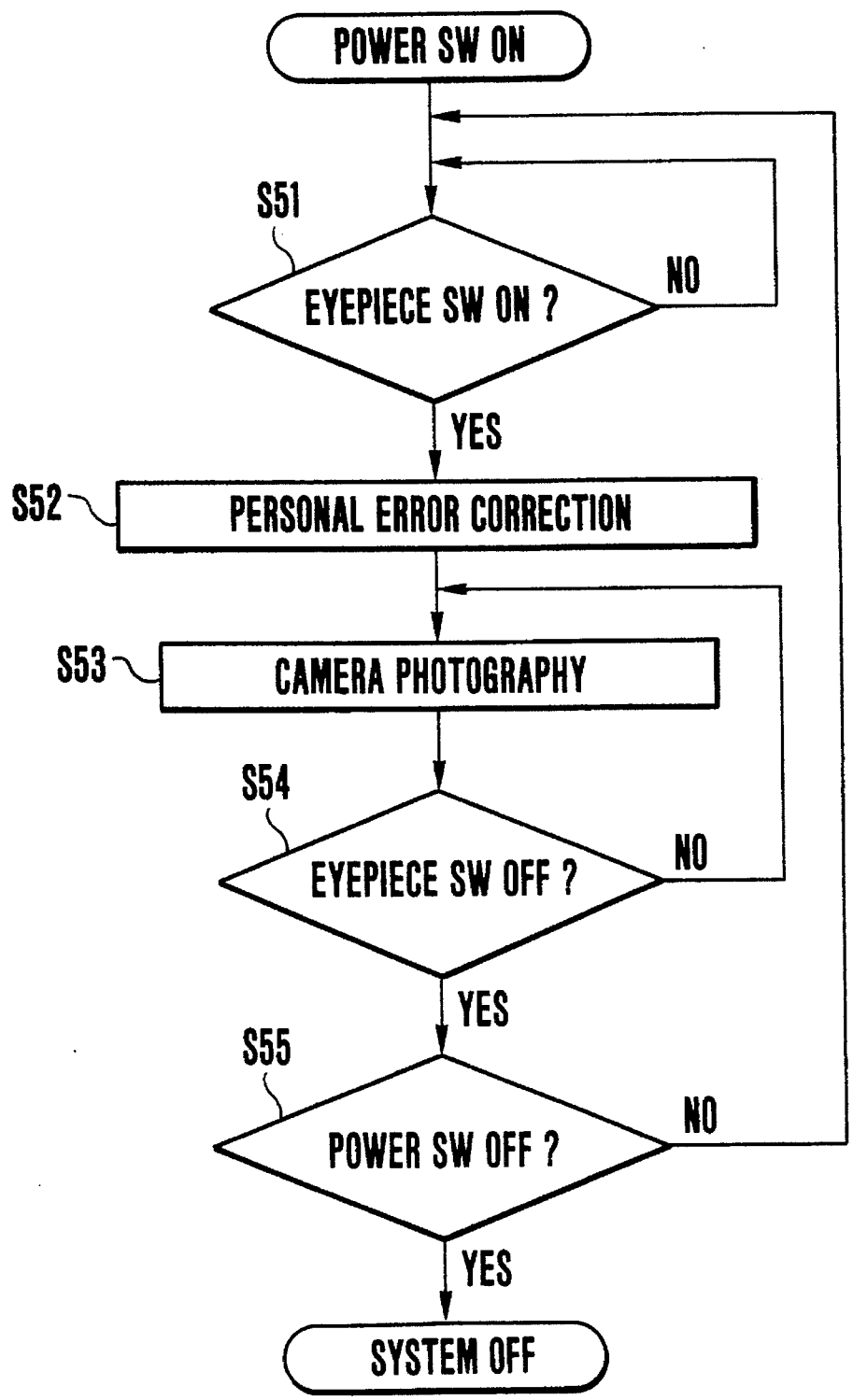
FIG. 16 is a flowchart showing one example of the flow of the operation of the system of the video camera shown in FIG. 15.

FIG. 15 is a schematic view of the external appearance of the third example of the video camera, and FIG. 16 is a flowchart showing the operation of the entire system of the third example.

In FIG. 15, the same reference numerals are used to denote elements substantially identical to those shown in FIG. 11, and description thereof is omitted.

In the third example, the video camera is provided with a main power switch 83' and an eyepiece switch 86'.

The flowchart of the operation of the entire system will be described below with reference to FIG. 16.

When the main power switch 83' of the video camera is turned on, the flow is started.

In Step S51, it is determined whether the photographer has brought the eye nearer to the electronic viewfinder, that is, it is determined whether an eyepiece switch 86' has been turned on. If it is determined that the eyepiece switch 86' has not yet been turned on, the video camera is left in its present state. If it is determined that the eyepiece switch 86' has been turned on, the process proceeds to Step S52.

In Step S52, the above-described personal error correction is performed. Then, the process proceeds to Step S53, where if the image-recording start/stop switch 84 is operated, camera photography is enabled.

In Step S54, it is determined whether the eyepiece switch 86' has been turned off, that is, it is determined whether the photographer has moved the eye away from the electronic viewfinder. If it is determined that the photographer has not moved the eye away from the electronic viewfinder, the process returns to Step S53, where the video camera is left in the camera photography-enable state. If it is determined that the photographer has moved the eye away from the electronic viewfinder, the process proceeds to Step S55.

In Step S55, it is determined whether the main power switch 83' has been turned off. If it is determined that the main power switch 83' has not been turned off, the process returns to Step S51. If it is determined that the main power switch 83' has been turned off, the system of the video camera is turned off.

In the above-described system operation, if the photographer brings the eye nearer to the electronic viewfinder, personal error correction is necessarily performed before photography is performed.

A video camera according to a second embodiment of the present invention will be described below.

First of all, reference is made to the parts of the second embodiment which differ from those of the first embodiment. The difference between the second embodiment and the first embodiment is that the video camera according to the second embodiment is arranged to be capable of automatically executing personal error correction if personal error correction associated with visual-line detection and diopter correction for the electronic viewfinder are performed once. This feature is realized by utilizing the fact that it is possible to identify individuals on the basis of the shapes of their eyes (hereinafter referred to as "eye data"). The other features are substantially the same as those of the first embodiment. The following detailed description will be made in connection with the steps of the processing operation of the second embodiment which differ from those of the processing operation of the first embodiment.

Figure 17:
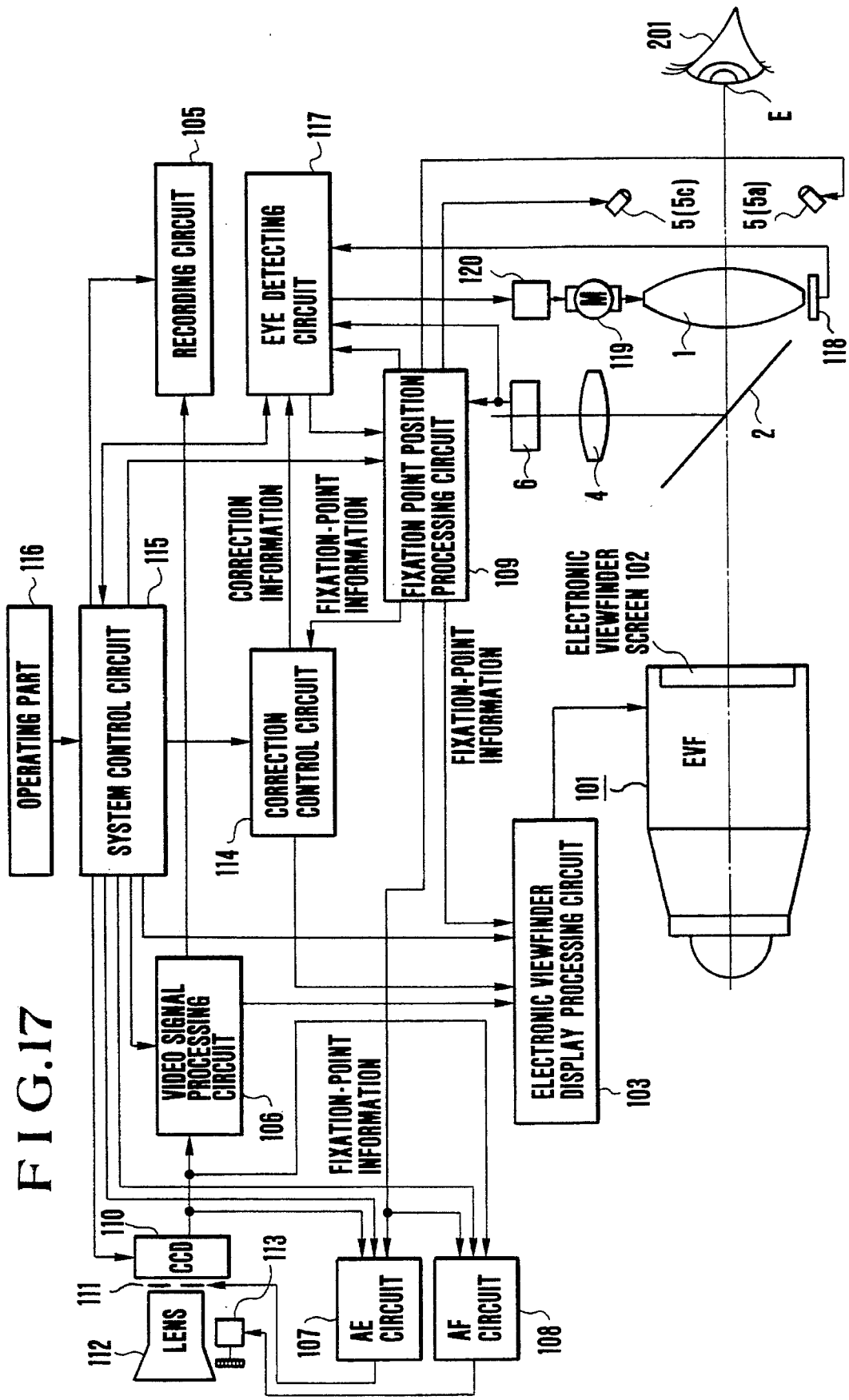
FIG. 17 is a schematic block diagram showing the essential parts of a video camera according to a second embodiment of the present invention.

FIG. 17 is a schematic block diagram showing the essential parts of the video camera according to the second embodiment of the present invention. In FIG. 17, the same reference numerals are used to denote elements substantially identical to those shown in FIG. 1, and description thereof is omitted.

The video camera shown in FIG. 17 includes an eye detecting circuit 117 having a memory function. Eye data and personal error correction data about visual-line detection as well as diopter correction data for the electronic viewfinder 101 are memorized in the eye detecting circuit 117. The eye detecting circuit 117 also has the function of detecting a correlation between past eye data and eye data about an eyeball which is presently used to look into the electronic viewfinder 101.

The shown video camera also includes an encoder 118 for outputting position information on the eyepiece lens 1, a motor 119 for moving the eyepiece lens 1, and a driver 120 for driving the motor 119.

Figure 18:
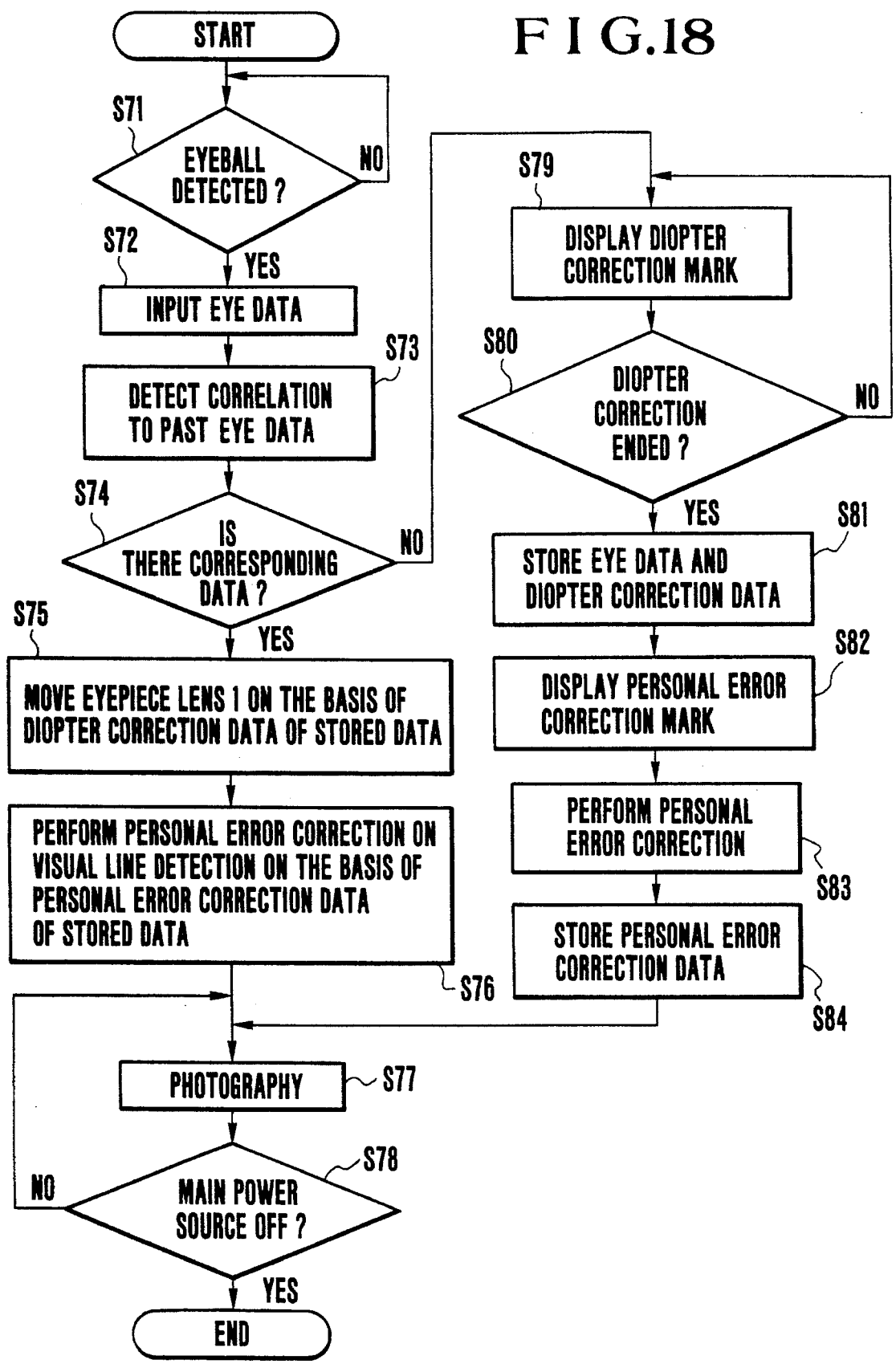
FIG. 18 is a flowchart showing one example of the flow of the operation of the system of the video camera shown in FIG. 17.
Figure 19:
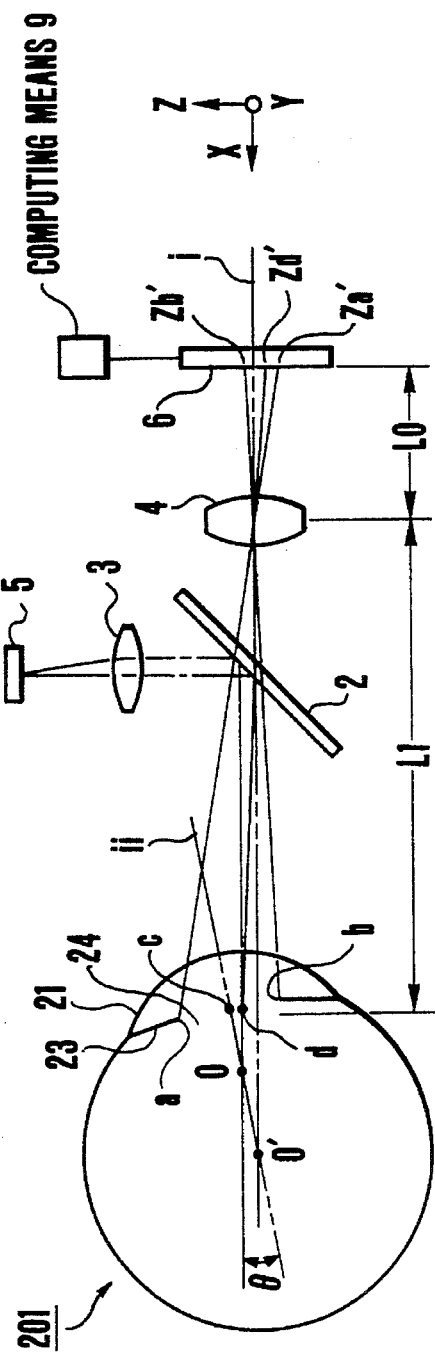
FIG. 19 is a schematic view which serves to illustrate a visual-line detecting method.
Figure 20:
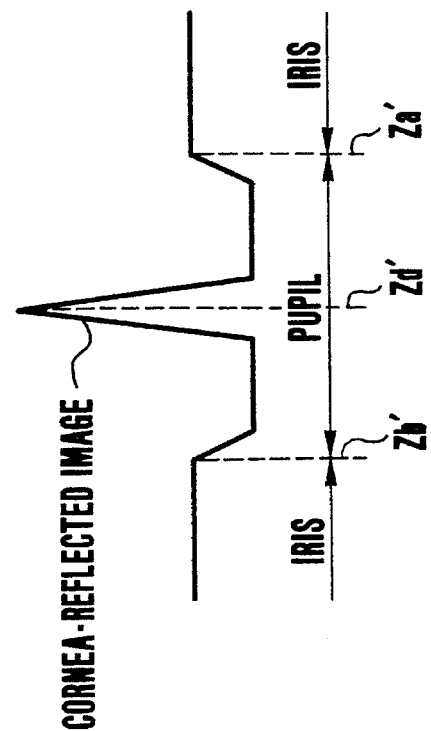
FIG. 20 is an intensity diagram of an output signal from the photoelectric element array shown in FIG. 19.

FIG. 18 is a flowchart of the operation of executing the personal error correction associated with visual-line detection and diopter correction for the electronic viewfinder.

In the flowchart of FIG. 18, when the operating part 116 is operated to turn on the main power source, the flow is started.

In Step S71, it is determined whether a photographer is looking into the electronic viewfinder 101. This decision is made by the fixation point position processing circuit 109.

If it is determined that the photographer is looking into the electronic viewfinder 101, the process proceeds to Step S72, where an image signal indicative of the eye of the photographer (hereinafter referred to as "eye data") is inputted and memorized in the eye detecting circuit 117.

Then, the process proceeds to Step S73, where a correlation between the eye data presently memorized in step S72 and the past eye data previously memorized in the eye detecting circuit 117 is detected.

In Step S74, it is determined from the result of the detection performed in Step S73 whether there is corresponding eye data among the past eye data. If it is determined that there is corresponding eye data among the past eye data, the process proceeds to Step S75, where diopter correction data associated with the corresponding past eye data is read out. On the basis of the diopter correlation data, the motor 119 is driven to move the eyepiece lens 1, thereby automatically executing diopter correction. The process proceeds to Step S76.

In Step S76, personal error correction data associated with the corresponding eye data is read out. The personal error correction associated with visual-line detection, which is performed in the fixation point position processing circuit 109, is automatically performed on the basis of the personal error correction data.

The process proceeds to Step S77, where camera photography is enabled.

In Step S78, it is determined whether the main power source has been turned off. If it is determined that the main power source has not been turned off, the process returns to Step S77. If it is determined that the main power source has been turned off, the flow is brought to an end.

If it is determined in Step S74 that there is no corresponding past eye data, the process proceeds to Step S79. In Step S79, a diopter correction mark is displayed on the electronic viewfinder screen 102, so that the photographer is instructed to perform diopter correction.

In Step S80, it is determined whether the diopter correction has been completed. If the photographer operates a switch (not shown) or the like to input a signal indicative of the completion of the diopter correction, it is determined that the diopter correction has been completed, and the process proceeds to Step S81. In Step S81, the eye detecting circuit 117 detects data on the diopter correction of the photographer who is presently looking into the electronic viewfinder 101, on the basis of a signal outputted from the encoder 118. The detected diopter correction data is memorized in the eye detecting circuit 117 together with eye data about the eye of the photographer who is presently looking into the electronic viewfinder 101.

Then, the process proceeds to Step S82, where to inform the photographer of the start of the personal error correction associated with visual-line detection, a message to that effect is displayed on the electronic viewfinder screen 102.

In Step S83, the personal error correction explained in connection with the first embodiment is executed, and the personal error correction data calculated by the fixation point position processing circuit 109 is memorized in the fixation point position processing circuit 109 itself and is also inputted to the eye detecting circuit 117.

In Step S84, the personal error correction data on the personal error correction executed in Step S83 is memorized in the eye detecting circuit 117. This personal error correction data is memorized in association with the eye data about the eye of the photographer who is presently looking into the electronic viewfinder 101. When the processing of Step S84 is completed, the process proceeds to Step S77.

In the above-described processing, in a case where several persons use a single video camera, if one photographer manually performs diopter correction of the video camera once, the video camera can automatically execute diopter correction on the basis of the past diopter correction data each time the photographer is to use the video camera at a later time. Similarly, in the case of the personal error correction associated with visual-line detection, if one photographer performs such personal error correction once, the video camera can automatically execute personal error correction associated with visual-line detection on the basis of the past personal error correction data each time the photographer is to use the video camera at a later time.

In addition, according to the present invention, since a deviation between the optical axis and the visual axis of an eyeball of a photographer is corrected to detect a correct direction of the visual line of the eyeball, an automatic focussing operation, an automatic exposure operation and other camera operations can be controlled by the photographer at will.

In addition, it is possible to provide a novel video camera which satisfies the usefulness, preciseness and high-speed response of an automatic function as well as the freedom of photography under manual control.

According to either of the above-described embodiments of the present invention, it is possible to provide an optical visual-line detecting method capable of achieving high-precision detection of a visual line in an electronic viewfinder with a substantial degree of freedom being given to the positional relationship between the video camera and the photographer.

According to either of the above-described embodiments of the present invention, it is possible to provide a video camera having a portable and economic video-camera construction which includes a visual-line detecting device as a built-in assembly, as well as a novel method for video-camera control. By using the video camera according to either of the above-described embodiments, a photographer can fully utilize a highly advanced automatic function of the video camera while causing the operation of the video camera to faithfully reflect his/her intention.

The present invention may be practiced in various other ways without departing from the spirit or essential feature thereof.

For example, although each of the embodiments utilizes the method of detecting a visual line by projecting infrared light onto an eye, it is also possible to use a method of inputting an image signal indicative of an image of an eye through an image sensor or the like without emitting infrared light, thereby detecting a visual line from the inputted image signal.

Although each of the embodiments has been described with reference to the video camera, the range of applications of the present invention is not limited to the video camera.

The foregoing description of the embodiments has been given for illustrative purposes only and not to be construed as imposing any limitation in every respect.

The scope of the invention is, therefore, to be determined solely by the following claims and not limited by the text of the specification, and alterations made within a scope equivalent to the scope of the claims fall within the true spirit and scope of the invention.

What is claimed is:

1. A camera capable of utilizing a visual line of a photographer for a photographic operation, comprising:

a) visual-line detecting means for detecting a visual-line position of the photographer; and b) correcting means for correcting a deviation between the visual-line position detected by said visual-line detecting means and an actual visual-line position of the photographer's eye, said correcting means automatically performing the correction operation of the deviation according to an operation for enabling a photographic operation of said camera.

2. A camera according to claim 1, further comprising a viewfinder for presenting a photographic image to the photographer, said correcting means being arranged to display a fixation target on a screen of said viewfinder, detect a visual-line position of the photographer's eye which is fixed on the fixation target, through said visual-line detecting means, and find a deviation between the visual-line position and the fixation target, thereby executing correction of the deviation.

3. A camera according to claim 2, wherein while said correcting means is operating, a background of the fixation target is displayed in a single color on the screen of said viewfinder.

4. A camera according to claim 1, further comprising memory means for storing correction information detected by said correcting means.

5. A camera according to claim 1, further comprising:

a viewfinder for presenting a photographic image to the photographer;

eye detecting means for detecting eye information on an eye which is being used to look into said viewfinder;

memory means for storing correction information detected by said correcting means and eye information detected by said eye detecting means at that time in such a manner that the correction information is associated with the eye information; and decision means for comparing eye information on an eye which is being used to look into said viewfinder, detected by said eye detecting means, with eye information stored in said memory means, and determining whether eye information on the same eye is present in said memory means;

wherein if said decision means determines that the eye information on the same eye is present in said memory means, said correcting means executes correction of the visual-line position detected by said visual-line detecting means on the basis of correction information stored in said memory means in association with the eye information on the same eye.

6. A camera according to claim 5, wherein if said decision means determines that the eye information on the same eye is absent in said memory means, said correcting means is operated.

7. A camera according to claim 1, further comprising:

focus detecting means for controlling a focus condition of said camera, said focus detecting means sets a focus detecting area in a field according to the visual-line position information corrected the deviation and controls the focus condition according to focus information detected in the focus detecting area.

8. A camera according to claim 1, further comprising:

exposure control means for controlling an exposure condition of said camera, said exposure control means sets a light measuring area in a field according to the visual-line position information corrected the deviation and controls the exposure condition according to exposure information detected in the light measuring area.

9. A visual-line detecting device comprising:

a) an observing system for permitting observation of an object;

b) access-of-eye detecting means for detecting whether an eye has accessed said observing system by detecting an approach of the eye;

c) fixation point detecting means for detecting a fixation point of the eye which has accessed said observing system;

d) correcting means for correcting a deviation between a fixation point detected by said fixation point detecting means and an actual fixation point of the eye; and e) controlling means for controlling an operation of said correcting means in accordance with an output from said access-of-eye detecting means.

10. A visual-line detecting device according to claim 9, further comprising display means for displaying a fixation target within an viewing field of said observing system, and said fixation point detecting means detecting the fixation point of the eye which is fixed on the fixation target and said correcting means detecting a deviation between the detected fixation point and the fixation target and correcting the deviation.

11. A visual-line detecting device according to claim 10, wherein the fixation target is sequentially displayed at a plurality of different locations within the viewing field of said observing system by said displaying means.

12. A visual-line detecting device according to claim 10, wherein a background of the fixation target is displayed in a single color within the viewing field of said observing system by said displaying means during an operation of said correcting means.

13. A visual-line detecting device according to claim 9, further comprising memory means for storing correction information detected by said correcting means.

14. A visual-line detecting device according to claim 9, wherein said observing system is a viewfinder and a visual-line position detected by said visual-line detecting device is utilized for camera control.

15. A visual-line detecting device, comprising:

a) an observing system for permitting observation of an object;

b) visual-line detecting means for detecting a visual-line position of a photographer's eye which is being used to look into said observing system;

c) displaying means for displaying a fixation target within a viewing field of said observing system and displaying a background of the fixation target in a single color distinguishable from a color of the fixation target inhibiting a display of the image of the object; and d) correcting means for correcting a deviation between the visual-line position of the photographer's eye detected by said visual-line detecting means and the fixation target, and correcting the deviation of the visual-line position detected by said visual-line detecting means.

16. A visual-line detecting device according to claim 15, wherein said displaying means displays the fixation target at a plurality of different locations within the viewing field of said observing system.

17. A visual-line detecting device according to claim 15, wherein said observing system camera having has a viewfinder and a visual-line position detected by said visual-line detecting device is utilized for controlling an operation of said observing system.

18. A visual-line detecting device according to claim 17, wherein said observing system having focus detecting means for controlling a focus condition of said camera, said focus detecting means sets a focus detecting area in a field according to the visual-line position information corrected the deviation and controls the focus condition according to focus information detected in the focus detecting area.

19. A visual-line detecting device according to claim 17, wherein said observing system having exposure control means for controlling an exposure condition of said camera, said exposure control means sets a light measuring area in a field according to the visual-line position information corrected the deviation and controls the exposure condition according to exposure information detected in the light measuring area.

20. A visual-line detecting device according to claim 15, wherein said visual-line detecting means has light source means for projecting light onto an eyeball of the photographer, and detects a visual line from light reflected from the eyeball.

21. An optical apparatus comprising:

a) a viewfinder for permitting observation of an object;

b) eyesight correcting means for executing eyesight correction of said viewfinder;

c) eye detecting means for detecting eye information on an eye which accesses said viewfinder; and d) controlling means for controlling the driving of said eyesight correcting means in accordance with the eye information.

22. An optical apparatus according to claim 21, further comprising:

memory means for storing correction information obtained when said eyesight correcting means is manually operated and eye information detected by said eye detecting means at that time, in such a manner that the correction information is associated with the eye information; and decision means for comparing eye information on an eye which is being used to look into said viewfinder, detected by said eye detecting means, with eye information stored in said memory means, and determining whether eye information on the same eye is present in said memory means;

wherein if said decision means determines that the eye information on the same eye is present in said memory means, said controlling means drives said eyesight correcting means on the basis of correction information stored in said memory means in association with the eye information on the same eye.

23. An optical apparatus according to claim 22, wherein said controlling means instructs an observer to manually perform eyesight correction if said decision means determines that the eye information on the same eye is absent in said memory means.

24. A visual-line detecting device, comprising:

a) an observing system for permitting observation of an object;

b) visual-line detecting means for detecting a visual-line position of a photographer's eye which is being used to look into said observing system;

c) correcting means for correcting a deviation between the visual-line position detected by said visual-line detecting means and an actual visual-line position of the photographer's eye;

d) eye detecting means for detecting eye information on the photographer's eye which is being used to look into said observation system;

e) memory means for storing the information peculiar to the photographer s eye detected by said eye detecting means; and f) controlling means for controlling the operation of said correcting means by computing present eye information and the eye information stored in said memory means.

25. A visual-line detecting device according to claim 24, further comprising:

said memory means for storing correction information detected by said correcting means and eye information detected by said eye detecting means at that time, in such a manner that the correction information is associated with the eye information; and decision means for comparing eye information on an eye which is being used to look into said observing system, detected by said eye detecting means, with eye information stored in said memory means, and determining whether eye information on the same eye is present in said memory means;

wherein if said decision means determines that the eye information on the same eye is present in said memory means, said controlling means executes correction of the visual-line position detected by said visual-line detecting means on the basis of correction information stored in said memory means in association with the eye information on the same eye.

26. An optical apparatus according to claim 25, wherein said controlling means causes said correcting means to operate if said decision means determines that the eye information on the same eye is absent in said memory means.

* * * * *

UNITED STATES PATENT AND TRADEMARK OFFICE
CERTIFICATE OF CORRECTION

PATENT NO. : 5,606,390
DATED : February 25, 1997
INVENTOR(S) : Arai et al.

It is certified that error appears in the above-identified patent and that said Letters Patent is hereby corrected as shown below:

Col. 2, line 25, delete "za" and insert -- Za --.
Col. 5, line 64, delete "an lens" and insert -- a lens --.
Col. 6, line 5, delete "Control" and insert -- control --.
Col. 17, line 53, delete "having".

Signed and Sealed this

Seventeenth Day of March, 1998

Attest:

Attesting Officer

BRUCE LEHMAN

Commissioner of Patents and Trademarks